United States Patent [19]
Nield

[11] 3,886,231
[45] May 27, 1975

[54] THERMOPLASTIC COMPOSITIONS CONTAINING METHACRYLONITRILE POLYMER

[75] Inventor: Eric Nield, Ware, England

[73] Assignee: Imperial Chemical Industries Limited, London, England

[22] Filed: July 31, 1973

[21] Appl. No.: 384,292

Related U.S. Application Data

[63] Continuation of Ser. No. 669,379, Sept. 21, 1967, abandoned.

[30] Foreign Application Priority Data
Oct. 7, 1966 United Kingdom............... 45052/66

[52] U.S. Cl. .................. 260/876 R; 260/29.7 UA; 260/29.7 UP; 260/873; 260/878 R; 260/879; 260/880; 260/881
[51] Int. Cl. ........................................... C08f 29/56
[58] Field of Search ................................ 260/876 R

[56] References Cited
UNITED STATES PATENTS
2,802,809   8/1957   Hayes ............................... 260/880
3,222,422  12/1965   Cohen............................. 260/876 R
3,438,971   4/1969   Walker............................ 260/876 R Primary Examiner—Wilbert J. Briggs, Sr.
Attorney, Agent, or Firm—Cushman, Darby & Cushman

[57] ABSTRACT

A thermoplastic composition containing polymethacrylonitrile and polybutadiene which is (1) a graft copolymer comprising a superstrate of a methacrylonitrile polymer and a substrate of a diene rubber, (2) a blend of such a graft copolymer with a compatible resin, or (3) a blend of methacrylonitrile polymer with a compatible graft comprising a substrate of a diene rubber and a superstrate containing for example 45 to 90% (preferably 60 to 85%) molar of acrylonitrile copolymerised with 10 to 55% (preferably 15 to 40%) molar of at least one ethylenically unsaturated monomer.

6 Claims, No Drawings

THERMOPLASTIC COMPOSITIONS CONTAINING METHACRYLONITRILE POLYMER

This is a continuation of application Ser. No. 669,379, filed Sept. 21, 1967, and now abandoned.

This invention relates to thermoplastic compositions derived from methacrylonitrile and a diene rubber.

Polymethacrylonitrile unlike polyacrylonitrile is an amorphous polymer, and as such does not require very high temperatures for melt forming, e.g. injection moulding or extrusion. Unlike polyacrylonitrile, therefore, which degrades before it melts, it does not require the incorporation of other monomers in order to remove the crystallinity before moulding. However, as a moulding material it does suffer from being brittle. We have now found that tough strong materials may be obtained when a grafted rubber is incorporated into the polymethacrylontrile in an intimate manner. By this we mean that the polymethacrylontrile forms the superstrate of a graft copolymer having a rubber substrate, or that it is blended with a compatible graft having a rubber substrate.

A composition according to the invention is (1) a graft copolymer comprising a superstrate of a methacrylontrile polymer and a substrate of a diene rubber, (2) a blend of such a graft copolymer with a compatible resin, or (3) a blend of a methacrylontrile polymer with a compatible graft copolymer comprising a substrate of a diene rubber and a superstrate containing for example 45 to 90% (preferably 60 to 85% molar of acrylonitrile copolymerised with 10 to 55% (preferably 15 to 40%) molar of at least one ethylenically unsaturated monomer.

The methacrylontrile polymer is preferably a homopolymer but may contain up to a total of 10% molar of one or more copolymerisable ethylenically unsaturated monomers.

The other ethylenically unsaturated monomer is any such monomer (or mixture of monomers) that is copolymerisable using free-radical catalysts. Such monomers usually (but not always) contain olefinic methylene groups, and include for example, alkenes such as ethylene, propylene, butene-1, isobutene, pentene-1, hexene-1, 2-methylbutene-1, 2-methylpentene-1, 4-methylpentene-1, 2,4,4-trimethylpentene-1, octene, octadecene, cyclohexene hexene and methyenecyclohexane, conjugated aromatic olefines such as styrene and $\alpha$-methylstyrene, dienes such as butadiene and norbornadiene, esters of acrylic and methacrylic acids such as methyl, ethyl, n-butyl and 2-ethylhexyl acrylates and methyl and n-butyl methacrylates, vinyl esters such as vinyl acetate, vinyl ethers such as methyl and ethyl vinyl ethers, esters of fumaric acid, and unsaturated nitriles such as acrylonitrile, vinylidene cyanide, $\alpha$-methyleneglutaronitrile, $\alpha$-acetoxyacrylonitrile, $\alpha$-cyanostyrene, and esters of $\alpha$-cyanoacrylic acid. In minor amounts, there may be present for example vinyl chloride, vinylidene chloride, $\alpha$-chloroacrylonitrile, diallyl ether, divinyl ether and glycol dimethacrylate.

The softening point of polymethacrylonitrile compositions may be raised by copolymerising up to 10% molar of maleimide or a derivative thereof, in particular the N-aryl maleimides. A process for preparing N-aryl maleimides in good yield is described in British specification No. 1,041,027 and Dutch specification No. 66,07185. Many different anilines are readily available and yield N-aryl maleimides that may be used as comonomers for the novel copolymers. The aryl substituent is derived from an aromatic hydrocarbon or heterocycle in which one or more of the hydrogen atoms may be replaced by other atoms or groups. Substituents containing active hydrogen atoms, however, are generally to be avoided because they may interfere with polymerisations catalysed by free radicals. The aryl groups that may be present in the N-aryl maleimides include for example, phenyl, 4-biphenylyl, 1-naphthyl, all the mono- and di-methylphenyl isomers, 2,6-diethylphenyl, 2-, 3- and 4-chlorophenyl, 4-bromophenyl and other mono- and di-halophenyl isomers, 2,4,6-trichlorophenyl, 2,4,6-tribromophenyl, 4-n-butylphenyl, 2-methyl-4-n-butylphenyl, 4-benzylphenyl, 2-, 3- and 4-methoxyphenyl, 2-methoxy-5-chlorophenyl, 2-methoxy-5-bromophenyl, 2,5-dimethoxy-4-chlorophenyl, 2-, 3- and 4-ethoxyphenyl, 2,5-diethoxyphenyl, 4-phenoxyphenyl, 4-methoxycarbonylphenyl, 4-cyanophenyl, 2-, 3- and 4-nitrophenyl, and methyl-chlorophenyl (2,3-, 2,4-, 2,5- and 4,3- isomers). The N- (o-substituted phenyl) maleimides are generally less coloured than the other isomers or the unsubstituted compounds and may therefore be preferred if a relatively colourless product is desired. Norbornene and its derivatives have also been found to increase the softening point, but copolymerisation of these compounds with methacrylonitrile occurs only very slowly.

If one or more of the copolymerisable monomers is a conjugated aromatic olefine, it is highly desirable to ensure that the copolymer formed is a homogeneous copolymer. The conjugated aromatic olefine is selected from those of the formula $CH_2{:}CR.Ar$ and also acenaphthylene, indene and coumarone. In this formula R is hydrogen or methyl and Ar is an optionally ring-substituted residue of aromatic character having not more than 3 rings and each substituent (if any) having not more than 4 carbon atoms. Examples of such olefines include styrene, $\alpha$-methylstyrene, o-methylstyrene, m-methylstyrene, p-methylstyrene, 2,5-dimethylstyrene, 1-vinylnaphthalene, p-acetamidostyrene, ar-dibromostyrene, 2-vinylthiophene, N-vinylcarbazole and 2-methyl-5-vinylpyridine.

By the term "homogeneous copolymer" is meant a copolymer in which the polymer molecules formed early in the reaction have substantially the same average compositions as those formed subsequently.

The problem of obtaining a homogeneous copolymer found both with methacrylonitrile and with acrylontrile is associated with the high molar ratio of methacrylontrile or acrylontrile to aromatic olefine in the desired product; there is usually no difficulty when the molar ratio of the nitrile to the conjugated aromatic olefine is 1 or less. A homogeneous product can be made by arranging for the relative concentration of the aromatic olefine and the nitrile at the start of the reaction to be at such a level that the superstrate initially formed has the desired composition, and then adding further quantities of the aromatic olefine (together with some of the nitrile if desired) at a rate determined by the rate of polymer formation, so that the relative concentration of the aromatic olefine and the nitrile in the reaction mixture remains at the initially desired level.

The present invention is of course concerned primarily with thermoplastic compositions from methacrylontrile. An acrylonitrile polymer may be used as the compatible resin blended with a methacrylontrile graft copolymer, however, and particularly suitable high-acrylontrile copolymers are described in British specification Nos. 1,086,673 and 1,088,758 and Dutch specification No. 67,04231. Likewise acrylontrile may be the predominant monomeric unit in the superstrate of a graft copolymer with which the methacrylonitrile polymer is to be blended, and particularly suitable acrylonitrile graft copolymers of this type are described in French specification No. 1,475,403 and Dutch specification No. 67,04344.

The diene rubber in the substrate contains from 40 to 100% molar of at least one conjugated 1,3-diene monomer and from 0 to 60% of at least one other ethylenically unsaturated monomer copolymerisable with free-radical catalyst. Suitable dienes include for example, butadiene, isoprene, 2,3-dimethylbutadiene, piperylene and chloroprene. As comonomers acrylontrile and styrene are particularly convenient, although a wide variety of other monomers may be used, including many of those listed above as examples of ethylenically unsaturated comonomers. Diene homopolymers (e.g. polybutadiene) and copolymers with a low proportion of comonomer have lower glass transistion temperatures and may therefore be preferable especially when the product is required for service at low temperatures.

The compositions of the invention can be produced by a process comprising sequential polymerisation. In this process, the monomers for the superstrate are polymerised by free-radical catalysts in the presence of the diene rubber. The process is carried out using the appropriate techniques for polymerisations catalysed by free radicals, conveniently in bulk or in aqueous suspension or emulsion. A similar emulsion process or a stereospecific process may be used to make the diene rubber. The graft copolymer may then be employed as a latex or isolated from the polymerisation medium, freed from residual monomers, and dried. The product of this sequential polymerisation with methacrylonitrile may be blended if desired with a resin to produce tough and strong compositions. The methacrylonitrile grafts are therefore, according to the invention, useful materials for blending with resins to give tough compositions. The resin used for blending can be any compatible resin of adequate strength especially one having a high content of nitrile groups. This may be for example a methacrylontrile polymer or a copolymer of acrylonitrile (45 to 90% molar, preferably 60 to 85% molar) with at least one other copolymerisable ethylenically unsaturated monomer, e.g. a homogeneous copolymer with a conjugated aromatic olefine. Other suitable compatible polymers are polyethylene terephthalate, polyphenylene oxide, bisphenol-A polycarbonate, and aromatic polysulphones.

A product in many ways equivalent to such a blend may also be obtained directly by adjusting the conditions of the grafting polymerisation so that some of the methacrylonitrile superstrate monomer copolymerises to give some separate resin as well as the graft.

The resultant products are thus composed at least partially of the type of material usually referred to as graft copolymer. It is possible, however, that the superstrate in the grafted material is not all chemically bonded to the rubber but contains resin from the superstrate monomers associated with the rubber in a much more physical mixture than can normally be obtained by blending preformed polymers.

The invention therefore consists in the presence of methacrylonitrile polymer, either in the superstrate of the graft copolymer or as the resin with which the acrylonitrile graft copolymer specified above is blended.

The amount of rubber in the final blend is not the only factor governing toughness, which depends also on the amount of resin grafted on to the rubber in the graft used for blending.

Preferably the blend comprises from 1 to 50% by weight of the diene rubber. Compositions containing below 25% of the rubber are particularly hard scratch-resistant materials with high impact strength, and while there is an apparently smooth transition of properties the compositions containing at least 20% (preferably not more than 40%) of the rubber tend to be hard materials with very high impact strength.

The compositions of the invention, mixed with any desired fillers or reinforcing materials, lubricants and stabilisers, can be used as thermoplastic raw material to make articles which require a good resistance to impact. Their toughness coupled with high strength and high softening point may thus be displayed to advantage. For example, the compositions may be extruded into sheet or tube, and the sheet can be calendered with embossing of desired or can be shaped as required, e.g. by pressing, drawing or vacuum-forming. The compositions can also be compression-moulded and injection-moulded. Examples of articles that may thus be produced using the compositions of the invention include panelling and exterior casing for machinery (as in motor cars, office machines and household equipment), crash helmets, pipes for conveying fluids, and telephone receivers. The use of compositions of the invention having superior tensile strength coupled with rigidity and toughness may allow economy of material in comparison with currently used products in that thinner pieces would serve the same purpose. The advantageous physical properties of the compositions may also permit them to be used in engineering applications for which plastics have not hitherto been suitable.

The following examples illustrate the invention.

EXAMPLE 1

Polymethacrylonitrile was prepared as follows:
Methacrylonitrile (200 g), water (600 cm$^3$), potassium persulphate (1.0 g) and sodium dodecyl sulphate (3.5 g) were placed in a one-litre shaking autoclave. Air was removed and replaced by nitrogen. Polymerisation was carried out at 60°C for 18 hours to give polymethacrylonitrile as a latex in 99% yield calculated on solids content. Some of the latex was coagulated and the precipitated polymer was washed and dried. It had a reduced viscosity of 4.1, full and one-tenth Vicat softening points of 113°C and 107°C respectively, and an unnotched impact strength of 3.92 J/cm$^3$.

A graft copolymer of the type described in French specification 1,475,403 was prepared from polybutadiene, acrylontrile and isobutene as follows. Polybutadiene latex (205 g, containing 126 g of polybutadiene), acrylontrile (119.6 cm$^3$), cumene hydroperoxide (1.98 g), glucose (2.64 g), FeSO$_4$.7H$_2$O (0.264 g), Na$_4$P$_2$O$_7$.10H$_2$O (1.3 g) and water (532 cm$^3$) were placed in a one-litre shaking autoclave. Air was removed and replaced by nitrogen and isobutene (71.8 cm$^3$) was added. The mixture was shaken for 1.5 hours at about 20°C and then for 17.5 hours at 60°C. The resulting latex contained 26.7% of solids.

The polymethacrylontrile latex and the graft copolymer latex were mixed to give a blend containing 10% of polybutadiene. The mixed latices were coagulated with aqueous calcium chloride, and the blend was washed and dried. It gave a transparent plaque on compression-moulding at 200°C, with full and one-tenth Vicat softening points of 113°C and 107°C respectively, a notched impact strength of 0.745 J/cm$^2$, and a tensile yield stress of 8.05 kgf/mm$^2$.

EXAMPLE 2

Polymethacrylonitrile was prepared as described in Example 1, except that the polymerisation was carried out for 16 hours and the reaction mixture contained various amounts of octanethiol. The properties of the polymethacrylonitrile obtained were as follows:

| Octanethiol | Latex solids content | Reduced Viscosity |
|---|---|---|
| 0.95 cm$^3$ | 24.8% | 0.86 |
| 1.19 cm$^3$ | 24.75% | 0.73 |
| 2.38 cm$^3$ | 24.12% | 0.47 |

A graft copolymer of the type described in French specification No. 1,475,403 was prepared from polybutadiene, acrylontrile and isobutene as follows. Polybutadiene latex (586.3 g, containing 360 g of polybutadiene), glucose (8.22 g), cumene hydroperoxide (6.16 g) and water (1675 cm$^3$) were placed in a five-litre stirred autoclave. Air was removed and replaced by nitrogen (three cycles of pressurising to 7 kg/cm$^2$ with nitrogen and venting). Acrylonitrile (399 cm$^3$) was added, and the pressurising and venting was repeated. Isobutene (240 cm$^3$) was then added and the autoclave was shaken at 100 cycles/minute for 1 hour at 60°C. FeSO$_4$.7H$_2$O (0.205 g) and Na$_4$P$_2$O$_7$.10H$_2$O (1.03 g) were then added. Shaking was continued, and more FeSO$_4$.7H$_2$O (0.205 g) and Na$_4$P$_2$O$_7$.10H$_2$O (1.03 g) were added after 1 hour and the same quantities again after 2 hours. After 3.67 hours at 60°C, the mixture was cooled. The latex contained 26.62% of solids, indicating that the graft copolymer contained 49.8% of polybutadiene.

The polymethacrylontrile latices and the graft copolymer latex were mixed to give blends containing 10% of polybutadiene. The mixtures were coagulated using 1.5 volumes of 0.75% aqueous calcium chloride at 75°C, and the blends were washed three times with water at 60°C and then dried. They all gave transparent mouldings with the following properties:

| Polymethacrylonitrile reduced viscosity | Notched impact strength | Tensile yield stress |
|---|---|---|
| 0.86 | 0.30 J/cm$^2$ | 7.55 kgf/mm$^2$ |
| 0.73 | 0.30 J/cm$^2$ | 7.5 kgf/mm$^2$ |
| 0.47 | 0.20 J/cm$^2$ | 7.05 kgf/mm$^2$ |

EXAMPLE 3

The polymethacrylonitrile latex of Example 2 having a reduced viscosity of 0.86 was blended with a graft copolymer of the type described in Dutch specification No. 67,04344 made from polybutadiene, acrylontrile and styrene as follows. Polybutadiene latex (130.4 g, containing 80 g of polybutadiene), acrylontrile (49.65 cm$^3$), styrene (1.40 cm$^3$), cumene hydroperoxide (2.05 g), glucose (1.4 g) and water (650 cm$^3$) were placed in a reaction vessel. Air was removed and replaced by nitrogen. Sufficient of a mixture of FeSO$_4$.7H$_2$O (0.14 g) and Na$_4$P$_2$O$_7$.10H$_2$O (0.7 g) in 50 cm$^3$ of water was added to give a reasonable rate of polymerisation. Polymerisation was carried out at about 60°C, and styrene (20.7 cm$^3$) was added at a rate proportional to the rate of polymerisation. After three hours, the polymerisation was terminated by adding 0.5% sodium dimethyldithiocarbamate. The latex contained 14.87% of solids, indicating that the graft copolymer contained 61.4% of polybutadiene.

The blend produced contained 10% of polybutadiene and was isolated as described in Example 2. It gave slightly hazy compression mouldings with a tensile yield stress of 8.00 kgf/mm$^2$.

EXAMPLE 4

A sample of methacrylontrile copolymer comprising 97% by weight of methacrylontrile and 3% by weight of methyl methacrylate having a reduced viscosity of 0.52 and an acrylontrile/isobutene/polybutadiene graft copolymer prepared as described in Example 2, were blended at 170°–180°C on a steam heated two-roll mill having rollers 5.1 cm in diameter and 15.2 cm in length. The mixtures wre coagulated using 1.5 volumes of 0.5% aqueous Al$_2$(SO$_4$)$_3$ at 75°C, and the blends were washed three times with water at 60°C and then dried. The blends were stabilised with 1%, 2,6 - di-t-butyl 4-methyl phenyl and 0.5% dilauryl thiodipropionate.

The resultant crepe was compression moulded at 160°C at 20 tons/sq.in. (31.5 kgf/mm$^2$) for 5 minutes to give a transparent plaque having a notched impact strength of 0.19 J/cm$^2$ and a tensile strength of 6.5 kgf/mm$^2$.

EXAMPLE 5

A graft copolymer was prepared from polybutadiene and methacrylonitrile in the following manner.

Polybutadiene latex (207.3 g containing 130 g of polybutadiene), water (462 cm$^3$), methacrylontrile (130 g), cumene hydroperoxide (1.95 g), dextrose (2.6 g) and a solution of FeSO$_4$.7H$_2$O (0.26 g) and Na$_4$P$_2$O$_7$.10H$_2$O (1.3 g) in water (60 ml) were placed in a 1 litre shaking autoclave. Air was removed and replaced by nitrogen. Polymerisation was carried out at 60°C for 15½ hours. The mixture was then cooled and filtered. The latex contained 26.9% solids, indicating that the "graft" copolymer contained 55.9% of polybutadiene.

The above graft latex was blended with the following materials:

A. the polymethacrylontrile latex of Example 2 with reduced viscosity of 0.73;

B. a homogeneous acrylonitrile-styrene copolymer containing 70 mole % acrylonitrile having a reduced viscosity of 0.85, of the type described in Dutch specification No. 67,04231;

C. a homogeneous acrylonitrile-styrene copolymer containing 80 mole % acrylonitrile having a reduced viscosity of 0.69, of the type described in Dutch specification No. 67,04231.

The latices were blended together to give blends containing 10 and 20% polybutadiene. The mixtures were coagulated using 1.5 volumes of 0.5% aqueous Al$_2$(SO$_4$)$_3$ at 75°C, and the blends were washed three times with water at 60°C and then dried. The blends were stabilised with 1% 2,6 - di-t-butyl 4-methyl phenol and 0.5% dilauryl thiodipropionate.

After drying the blends were mixed on a two-roll mill at 170° to 180°C before compression moulding as described in Example 4.

The mouldings from blend A were transparent while those from B and C were opaque; they had the following properties.

| Blend | % polybutadiene | Notched impact strength J/cm$^2$ | Tensile yield stress kgf/mm$^2$ |
|---|---|---|---|
| A | 10 | 0.42 | 7.24 |
|   | 20 | 0.76 | 4.15 |
| B | 10 | 1.94 | 6.54 |
|   | 20 | 3.51 | 4.43 |
| C | 10 | 0.28 | 6.75 |
|   | 20 | 1.84 | 4.99 |

In the foregoing examples, the reduced viscosity was measured at 0.5% in dimethylformamide at 25°C and the tensile and impact strengths were measured as described below.

The unnotched impact test was carried out at 20°C on a specimen 0.9 cm wide and 0.3 cm thick, resting horizontally (with the narrow face uppermost) against two supports 3.8 cm apart. The specimen was struct centrally on the wider face by a horizontally moving pendulum falling from 30 cm, with more than sufficient energy to break the specimen. From the residual energy of the pendulum, the energy required to break the specimen was calculated and then divided by the effective volume (1/9 × 3.8 × 0.9 × 0.3 cm$^3$). The resulting value (expressed in joules/cm$^3$) represented by the energy required to cause cracks to form in the material.

In the notched impact test carried out at 20°C, a specimen 60 mm long, 6.5 mm wide and 3 mm thick was given a 45° notch 2.5 mm deep (tip radius 0.25 mm) in the centre of one edge. It was supported between two supports 50 mm apart and struck centrally on the edge opposite the notch by a pendulum dropping from 30 cm with more than sufficient energy to break the specimen. From the residual energy of the pendulum the energy required to break the specimen was calculated and divided by the cross-sectional area of the specimen at the notch. The resulting value (expressed in joules/cm$^2$) represented the energy required to break the material.

The tensile strength was measured at +20°C on specimens 76 mm long and 14 mm wide milled from a compression-moulded sheet 3 mm thick. The cross-sectional area across the centre of the specimen was reduced to 9 mm$^2$ by milling two slots (radius of curvature 31 mm) opposite each other in the long edges so that the narrowest width of the specimen was 3 mm. A tensile stress was then applied to the specimen sufficient to elongate it at the rate of 12.7 mm/min. and the stress at the yield point was recorded.

I claim:

1. A thermoplastic blend of a resin which is a polymer consisting essentially of methacrylonitrile and 0 up to a total of 10% molar of at least one ethylenically unsaturated monomer selected from the group consisting of alkenes, conjugated aromatic olefins, esters of acrylic and methacrylic acids, vinyl esters, and a compatible graft polymer having a diene rubber substrate containing 40 to 100% molar of at least one conjugated diene monomer and from 60 to 0% molar of at least one other ethylenically unsaturated monomer copolymerizable therewith and a superstrate which is an acrylonitrile polymer containing 60 to 90% molar of acrylontrile and 40 to 10% of at least one ethylenically unsaturated monomer selected from the group consisting of alkenes, conjugated aromatic olefins, esters of acrylic and methyacrylic acids and vinyl esters, the blend comprising from 1% to 50% by weight of the diene rubber.

2. A blend according to claim 1 in which the resin is a homopolymer of methacrylonitrile.

3. A blend according to claim 1 in which the resin comprises 90 to 99% molar of units of methacrylonitrile and 10 to 1% molar of units of at least one other ethylenically unsaturated monomer copolymerizable therewith selected from alkenes, aromatic olefines, esters of acrylic and methacrylic acids and vinyl esters.

4. A blend according to claim 1 in which the superstrate is a homogeneous copolymer of acrylonitrile and a member of the group consisting of styrene and β-methylstyrene.

5. A blend according to claim 1 in which the said other ethylenically unsaturated monomer comprises isobutene.

6. A thermoplastic blend according to claim 1 in the form of a sheet or molding.

* * * * *